H. L. STEINER.
PIN.
APPLICATION FILED OCT. 23, 1911.

1,042,496.

Patented Oct. 29, 1912.

Witnesses
Herbert L. Kelley
E. J. Ogden

Inventor
Herbert L. Steiner.

By
Howard E. Barlow
Attorney

UNITED STATES PATENT OFFICE.

HERBERT L. STEINER, OF PROVIDENCE, RHODE ISLAND.

PIN.

1,042,496.

Specification of Letters Patent.

Patented Oct. 29, 1912.

Application filed October 23, 1911. Serial No. 656,118.

*To all whom it may concern:*

Be it known that I, HERBERT L. STEINER, a citizen of the United States, and resident of the city of Providence, in the county of Providence and State of Rhode Island, have invented certain new and useful Improvements in Pins, of which the following is a specification.

This invention relates to a pin of the type commonly known as a cuff or beauty pin whose pin-stem instead of being hinged to swing as is usual in this class of pins is held to slide endwise through suitable bearings in the pin body, and the object of this invention is to provide simple, practical and effective means whereby the pin stem is yieldingly retained in its closed position by a spring engaging an annular groove in the body of the pin stem.

With these and other objects in view, the invention consists of certain novel features of construction as will be more fully described and particularly pointed out in the appended claims.

Figure 1:
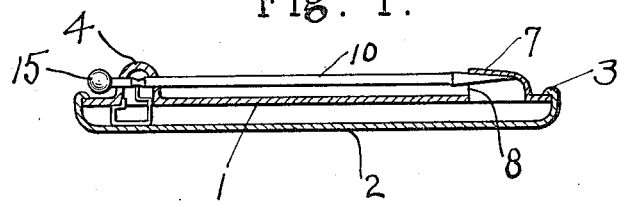
Figure 2:
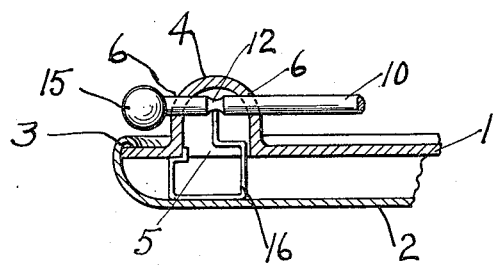
Figure 3:
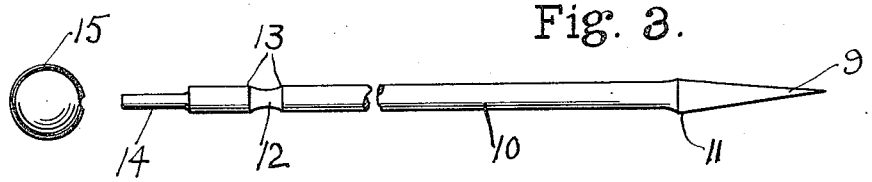
Figure 4:
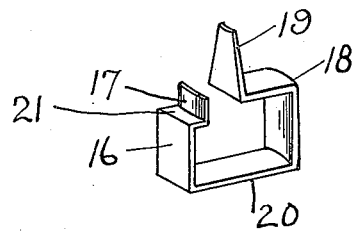

Of the accompanying drawings: Figure 1— is a sectional side elevation of a pin illustrating my improved construction. Fig. 2— is an enlarged sectional view illustrating the application of the spring for the purpose of yieldingly retaining the pin stem in its closed position. Fig. 3— is an enlarged detail of the pin stem. Fig. 4— is an enlarged perspective view of the retaining spring.

Referring to the drawings, 1 designates the back plate of the pin body, and 2 the front plate thereof whose edge 3 is rolled over that of the back plate for the purpose of securing the two together. This back plate is provided at one end with a bearing member 4 struck outward from this plate forming substantially a hemispherical socket having its inner portion 5 open to the space between said plates, but any other suitable or desired shape of bearing may be employed. The end wall of the socket is provided with holes or openings 6—6 in a line parallel with the longitudinal axis of the back plate. A somewhat cone-shaped pin point receiving member 7 is formed near the opposite end of this back plate by forcing the stock of the plate from the inner side outward similar to the method of forming the bearing member 4. The inner end wall of this member 7 is then cut away or removed as at 8 leaving only this end open for the free entry of the pointed end 9 of the pin stem 10 as it slides in a line substantially parallel with the face of the back plate 1. The body of this pin tongue 10 is enlarged or provided with a shoulder 11 near its pointed end to prevent its being withdrawn through the bearing member, and the body portion is provided near its opposite end with an annular groove 12, the side walls 13 of which groove, bevel or taper gradually to permit the pin to be readily withdrawn when this groove is engaged by the retaining spring presently described. This end of the pin may be reduced as at 14 to permit the ball or head 15 to be swaged thereon after the pin has been positioned in its bearing 4. In order to yieldingly engage and retain this pin stem or tongue in closed position in its bearing, I have provided a spring 16 formed preferably of flat stock and bent into substantially a hollow square, see Fig. 4, with portions 17 and 18 on opposite sides adapted to fit up into the open mouth 5 of the socket, and grip the edges thereof by spring pressure to assist this spring to remain in position. One end 19 of the spring extends upward to engage the annular recessed portion 12 in the body of the pin stem, and the opposite end 17 is bent inward and then upward forming a shoulder 21 to rest against the back plate outside of the socket and the end 17 to engage the inner wall of the socket. The base portion 20 of this spring is adapted to set against the inner face of the front plate 2 whereby when the front plate is placed in position and secured to the back plate the opposite shoulder portion 21 of this spring is bound and held against the inner face of the back plate thereby securely retaining this spring in position without the use of solder, rivets, or other means of fastening.

By providing an annular groove in the body of the pin stem and also forming the walls of said annular groove tapering or beveled permits the pin stem to be withdrawn without first necessitating its being turned or rotated to any particular position axially. In other words, if the notch or recess were on one side only of the pin stem, and this notch were formed with square sides or shoulders, it would necessitate the turning or rotating of the stem to a certain predetermined position before it could be engaged and retained by the spring end, and then turned to another predetermined position before it could be withdrawn from its locked position, which construction would be entirely impracticable in small pins of the size usually employed. Then again, by constructing my retaining spring so that the engaging tongue portion 19 is permitted to move with the endwise movement of the pin stem enables the spring to be withdrawn from the notch portion much more readily than as though this end were rigidly supported against this lateral movement and were permitted only to receive an endwise movement, that is toward and from the front of the pin.

My improved construction of pin has many practical advantages over the old style swing joint pin, among others being that the point of the pin when in its closed position is entirely covered and concealed and is securely locked against any amount of strain that could be applied to the pin body to withdraw it, thus obviating the use of complicated locking devices.

Another object of the invention is that the pin may be very readily removed from engagement with the fabric of the wearer. A pin of my improved construction may be manufactured with less expense than the old type of swing joint pin-tongue.

I claim:

1. A pin comprising a back plate, an ornamental front plate secured to said back plate, the latter plate being provided with a bearing member struck outward therefrom forming a socket, the end walls of said socket being provided with openings, a pin-tongue mounted to slide endwise through said socket openings, and a spring having a body portion supported between the front and back plates and retained in position by the union of said plates and having one portion extending into said socket to engage and yieldingly retain said pin-tongue in position by friction.

2. A pin comprising a back plate, an ornamental front plate secured to said back plate, the latter plate being provided with a bearing member struck outward therefrom forming a socket having its inner portion open to the space between said plates, the end walls of said socket being provided with openings, a pin-tongue mounted to slide endwise through said socket openings, the body of said pin-tongue being provided with an annular groove a short distance in from its head end, and a spring having its engaging end projecting into the socket and adapted to engage said groove in the pin to yieldingly retain the pin in its closed position, the body of said spring being supported in position by the inner face of the front plate.

In testimony whereof I affix my signature in presence of two witnesses.

HERBERT L. STEINER.

Witnesses:
HOWARD E. BARLOW,
E. I. OGDEN.

---

Copies of this patent may be obtained for five cents each, by addressing the "Commissioner of Patents, Washington, D. C."